(12) United States Patent
Garrastacho et al.

(10) Patent No.: US 8,495,787 B2
(45) Date of Patent: Jul. 30, 2013

(54) WINDSHIELD WIPER

(75) Inventors: Eddie Garrastacho, Miami, FL (US); Saied Hussaini, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 217 days.

(21) Appl. No.: 12/849,120

(22) Filed: Aug. 3, 2010

(65) Prior Publication Data
US 2012/0030894 A1 Feb. 9, 2012

(51) Int. Cl.
*B60S 1/02* (2006.01)
*B60S 1/38* (2006.01)

(52) U.S. Cl.
USPC .................................. 15/250.201; 15/250.43

(58) Field of Classification Search
USPC ....... 15/250.201, 250.001, 250.451–250.454, 15/250.3, 250.43, 250.44, 250.48, 250.361
IPC ....................................................... B60S 01/38
See application file for complete search history.

(56) References Cited

U.S. PATENT DOCUMENTS

| | | | |
|---|---|---|---|
| 2,910,715 A | 11/1959 | Ohrt | |
| 3,088,155 A | 5/1963 | Smithers | |
| 3,107,384 A | 10/1963 | Wise | |
| 3,131,413 A | 5/1964 | Anderson | |
| 3,696,497 A | 10/1972 | Quinlan et al. | |
| 3,881,214 A * | 5/1975 | Palu | 15/250.48 |
| 5,661,871 A * | 9/1997 | Scorsiroli | 15/250.452 |
| 5,970,569 A | 10/1999 | Merkel et al. | |
| 6,055,697 A | 5/2000 | Wollenschlaeger | |
| 6,161,248 A | 12/2000 | Merkel et al. | |
| 6,192,546 B1 | 2/2001 | Kotlarski | |
| 6,202,251 B1 | 3/2001 | Kotlarski | |
| 6,279,191 B1 | 8/2001 | Kotlarski et al. | |
| 6,292,974 B1 | 9/2001 | Merkel et al. | |
| 6,295,690 B1 | 10/2001 | Merkel et al. | |
| 6,308,373 B1 * | 10/2001 | Merkel et al. | 15/250.43 |
| 6,397,428 B2 | 6/2002 | Kotlarski | |
| 6,427,282 B1 | 8/2002 | Kotlarski | |
| 6,427,283 B1 | 8/2002 | Dietrich et al. | |
| 6,449,797 B1 | 9/2002 | De Block | |
| 6,516,491 B2 | 2/2003 | Merkel et al. | |
| 6,523,218 B1 | 2/2003 | Kotlarski | |
| 6,530,111 B1 | 3/2003 | Kotlarski | |
| 6,553,607 B1 | 4/2003 | De Block | |
| 6,581,237 B1 | 6/2003 | Kotlarski | |

(Continued)

FOREIGN PATENT DOCUMENTS

| | | |
|---|---|---|
| DE | 100 43 426 | 3/2002 |
| EP | 0 316 114 | 5/1989 |
| GB | 2 346 318 | 8/2000 |

*Primary Examiner* — Joseph J Hail
*Assistant Examiner* — Marc Carlson
(74) *Attorney, Agent, or Firm* — Berenato & White, LLC

(57) ABSTRACT

A windshield wiper comprises a wiper blade including a squeegee portion for contacting a surface and a body supporting the squeegee portion. A primary spline is engaged with the body and has a first closed end and a second open end. A support structure is provided to attach the wiper to a wiper arm on a vehicle. At least one spoiler is slidingly disposed on the primary spline above the secondary spline. A secondary spline is slidingly disposed between the body and the support structure, whereby the secondary spline is retained in place by caps disposed at the first and second ends of the primary spline. The secondary spline is removably disposed between said wiper blade and said support structure and retained in place by end caps.

14 Claims, 9 Drawing Sheets

U.S. PATENT DOCUMENTS

| | | |
|---|---|---|
| 6,611,988 B1 | 9/2003 | De Block |
| 6,634,055 B1 | 10/2003 | De Block |
| 6,640,380 B2 | 11/2003 | Rosenstein et al. |
| 6,654,984 B2 | 12/2003 | Hoshino |
| 6,675,432 B1 | 1/2004 | De Block |
| 6,675,434 B1 | 1/2004 | Wilhelm et al. |
| 6,681,440 B2 | 1/2004 | Zimmer et al. |
| 6,799,348 B1 | 10/2004 | Swanepoel et al. |
| 6,810,556 B1 | 11/2004 | Kotlarski |
| 6,836,926 B1 | 1/2005 | De Block |
| 6,836,927 B2 | 1/2005 | De Block et al. |
| 6,874,195 B2 | 4/2005 | Kotlarski et al. |
| 6,886,213 B2 | 5/2005 | Merkel et al. |
| 6,904,639 B2 | 6/2005 | Dietrich et al. |
| 6,944,905 B2 | 9/2005 | De Block et al. |
| 6,966,096 B2 | 11/2005 | Baseotto et al. |
| 6,973,698 B1 | 12/2005 | Kotlarski |
| 6,978,512 B2 | 12/2005 | Dietrich et al. |
| 7,028,368 B2 * | 4/2006 | Lee et al. ................. 15/250.201 |
| 7,143,463 B2 | 12/2006 | Baseotto et al. |
| 7,150,065 B2 | 12/2006 | Zimmer |
| 7,150,066 B1 | 12/2006 | Huang |
| 7,159,267 B2 | 1/2007 | Son |
| 7,210,189 B2 * | 5/2007 | Nacamuli ................. 15/250.201 |
| 7,228,588 B2 | 6/2007 | Kraemer et al. |
| 7,293,321 B2 | 11/2007 | Breesch |
| 7,350,259 B2 * | 4/2008 | Walworth et al. ......... 15/250.201 |
| 7,370,385 B2 | 5/2008 | Chiang |
| D579,401 S | 10/2008 | Garrastacho et al. |
| 7,451,520 B2 | 11/2008 | Weiler et al. |
| 7,461,429 B2 | 12/2008 | Huang |
| 7,464,433 B2 | 12/2008 | Thomar et al. |
| 7,484,264 B2 | 2/2009 | Kraemer et al. |
| 7,509,704 B2 | 3/2009 | Bauer et al. |
| 7,523,520 B2 | 4/2009 | Breesch |
| 7,540,061 B1 * | 6/2009 | Huang ...................... 15/250.201 |
| 7,540,062 B1 * | 6/2009 | Huang ...................... 15/250.201 |
| 7,559,110 B1 | 7/2009 | Kotlarski et al. |
| 7,581,279 B2 | 9/2009 | Baseotto et al. |
| 7,581,280 B2 | 9/2009 | Op't Roodt et al. |
| 7,603,741 B2 | 10/2009 | Verelst et al. |
| 7,607,194 B2 | 10/2009 | Weber et al. |
| 7,621,016 B2 | 11/2009 | Verelst et al. |
| 7,644,483 B2 | 1/2010 | Thomar et al. |
| 7,669,276 B2 | 3/2010 | Verelst et al. |
| 7,698,775 B2 * | 4/2010 | Lee ........................ 15/250.201 |
| 7,797,787 B2 | 9/2010 | Wilms et al. |
| 7,827,652 B2 * | 11/2010 | Yang et al. ................. 15/250.32 |
| 7,861,363 B2 * | 1/2011 | Moll et al. ................. 15/250.201 |
| 7,979,948 B2 * | 7/2011 | Chou ....................... 15/250.201 |
| 2001/0004783 A1 | 6/2001 | Kotlarski |
| 2003/0014828 A1 | 1/2003 | Edner-Walter et al. |
| 2003/0159229 A1 | 8/2003 | Weiler et al. |
| 2004/0025281 A1 | 2/2004 | Baseotto et al. |
| 2004/0098821 A1 | 5/2004 | Kraemer et al. |
| 2004/0111820 A1 | 6/2004 | Aoyama et al. |
| 2004/0181894 A1 * | 9/2004 | Lee et al. ................. 15/250.201 |
| 2004/0211021 A1 | 10/2004 | Weber et al. |
| 2005/0011033 A1 | 1/2005 | Thomar et al. |
| 2005/0177970 A1 | 8/2005 | Scholl et al. |
| 2005/0251946 A1 | 11/2005 | Heinrich et al. |
| 2006/0010636 A1 | 1/2006 | Vacher |
| 2006/0021178 A1 | 2/2006 | Verelst et al. |
| 2006/0026786 A1 | 2/2006 | Ku |
| 2006/0059647 A1 | 3/2006 | Ostrowski |
| 2006/0090282 A1 | 5/2006 | Hoshio |
| 2006/0117515 A1 | 6/2006 | Fink et al. |
| 2006/0117516 A1 | 6/2006 | Wilms et al. |
| 2006/0179597 A1 | 8/2006 | Hoshino et al. |
| 2006/0207050 A1 | 9/2006 | Shanmugham et al. |
| 2006/0218740 A1 | 10/2006 | Coughlin |
| 2006/0282972 A1 | 12/2006 | Huang |
| 2007/0011840 A1 | 1/2007 | Gilli |
| 2007/0067939 A1 | 3/2007 | Huang |
| 2007/0067940 A1 | 3/2007 | Huang |
| 2007/0067941 A1 | 3/2007 | Huang |
| 2007/0226941 A1 | 10/2007 | Kraemer et al. |
| 2008/0028564 A1 | 2/2008 | Ku |
| 2008/0047090 A1 | 2/2008 | Ku |
| 2008/0098559 A1 * | 5/2008 | Machida et al. ......... 15/250.201 |
| 2008/0163448 A1 * | 7/2008 | Yang et al. ............... 15/250.352 |
| 2008/0178409 A1 | 7/2008 | Dietrich et al. |
| 2008/0235896 A1 * | 10/2008 | Cheng ....................... 15/250.201 |
| 2008/0250596 A1 | 10/2008 | Kraemer |
| 2008/0313841 A1 | 12/2008 | De Block et al. |
| 2009/0064439 A1 | 3/2009 | Weiler et al. |
| 2009/0089956 A1 * | 4/2009 | De Block et al. ......... 15/250.201 |
| 2009/0188069 A1 | 7/2009 | Crabbe et al. |
| 2010/0024150 A1 | 2/2010 | Kraemer et al. |
| 2010/0107354 A1 | 5/2010 | Verelst et al. |
| 2010/0146727 A1 | 6/2010 | Coemans et al. |
| 2010/0180395 A1 | 7/2010 | Aznag |
| 2010/0180396 A1 | 7/2010 | Van De Rostyne et al. |
| 2010/0218333 A1 | 9/2010 | Ritt |

* cited by examiner

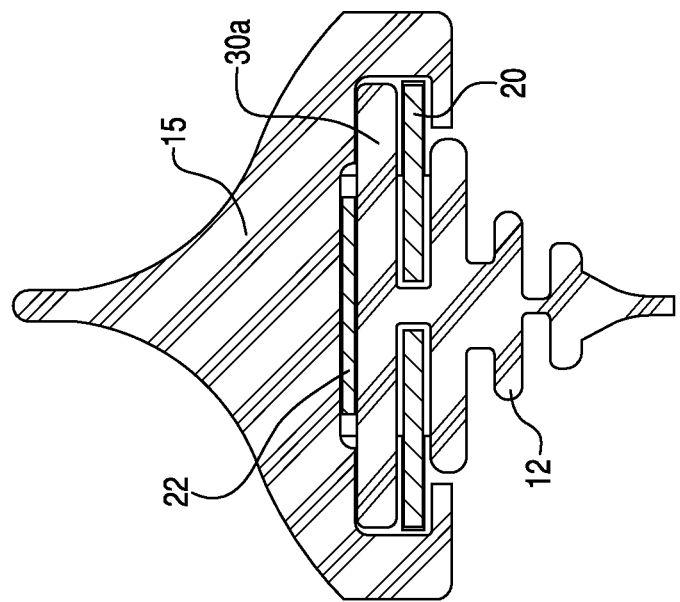
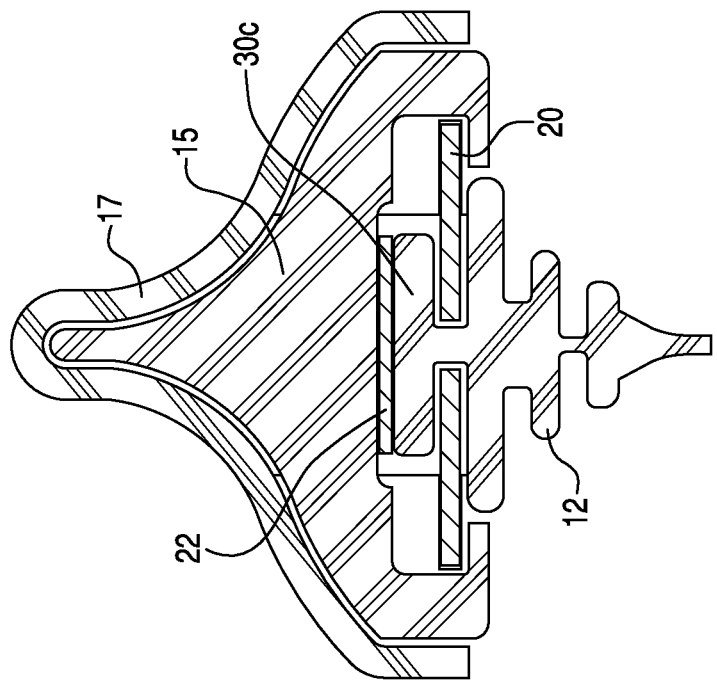

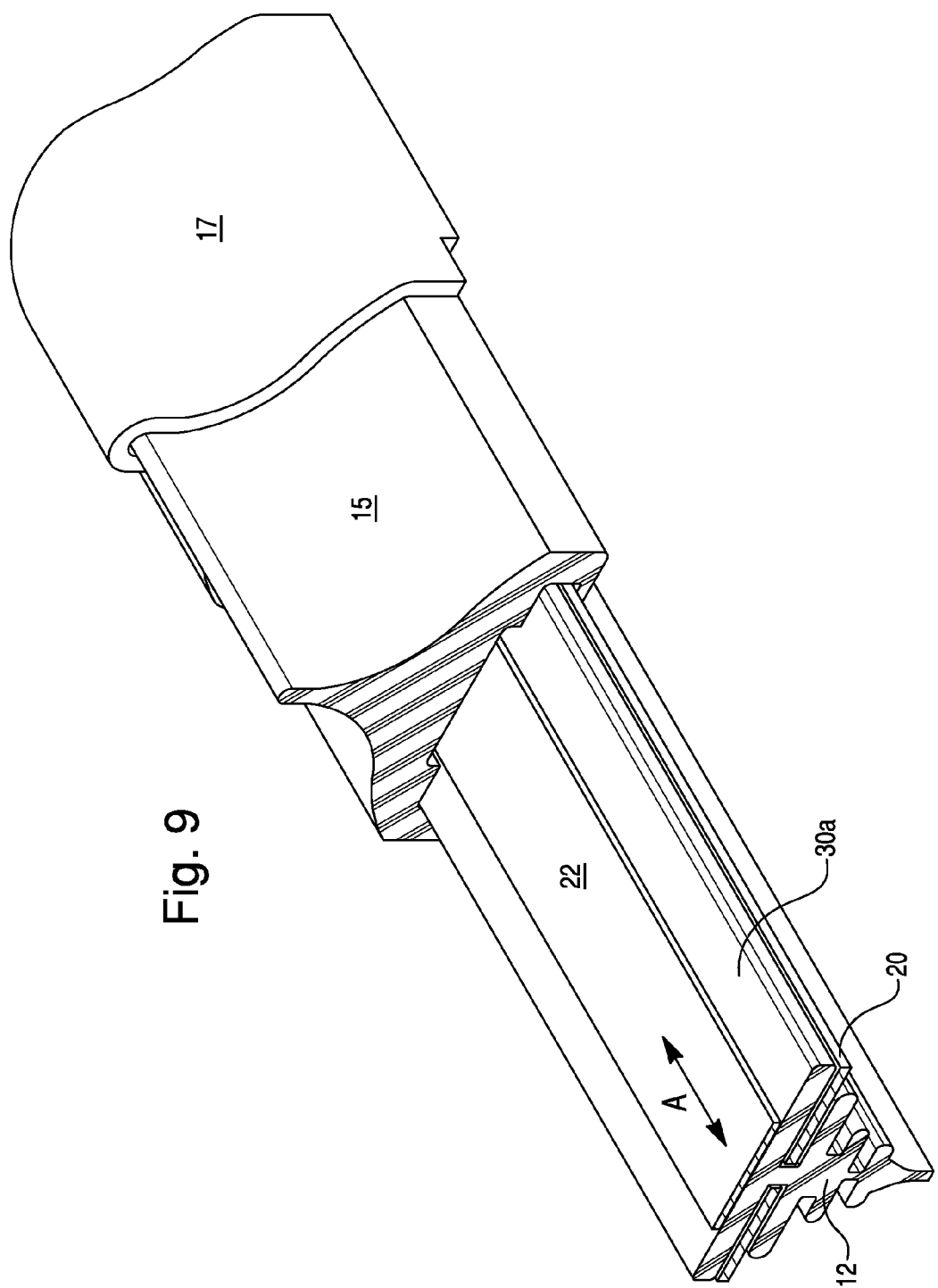

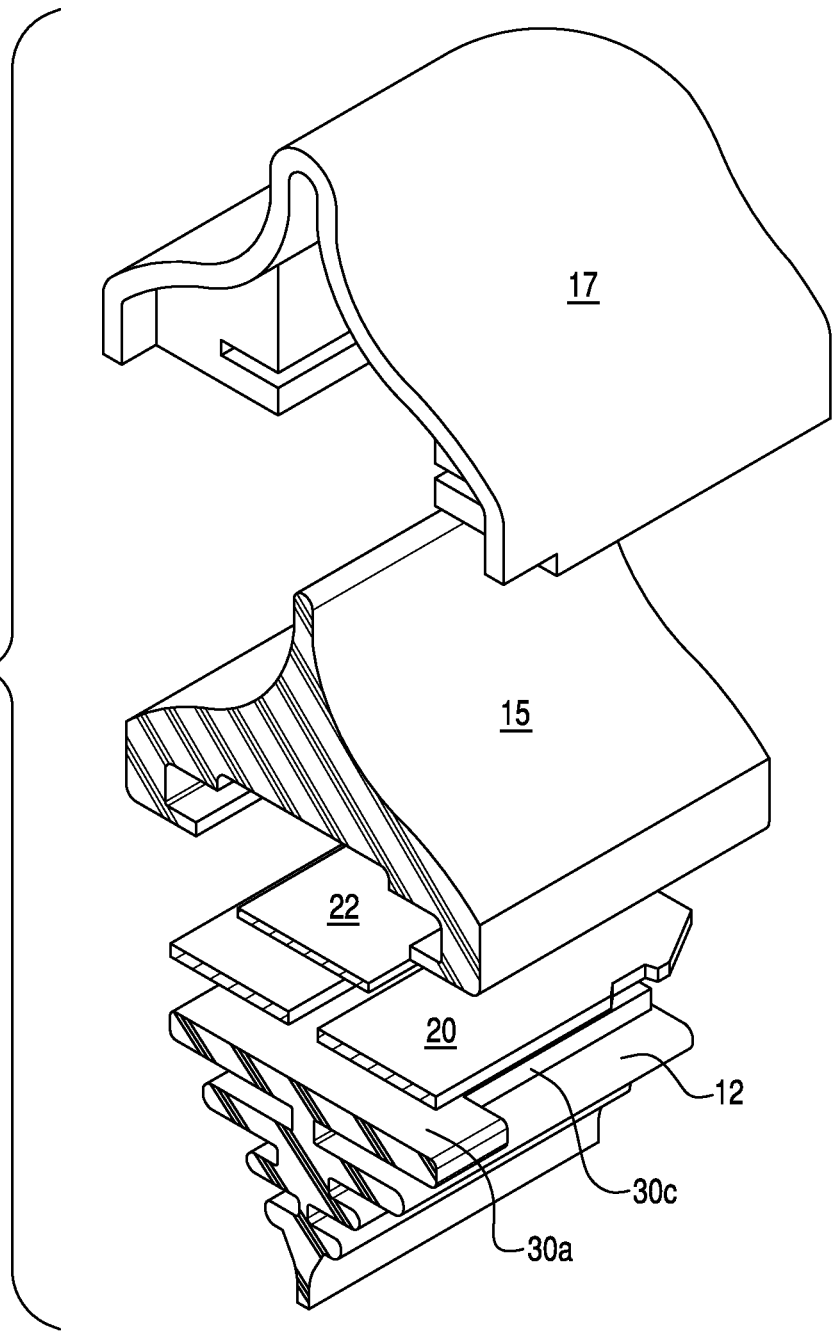

WINDSHIELD WIPER

FIELD OF THE INVENTION

The present invention is directed to windshield wipers.

BACKGROUND

Windshields are a standard feature found in many vehicles including cars, trucks, motorcycles, boats, and airplanes. In order to keep a windshield clean, vehicles are usually provided with at least one windshield wiper. The windshield wiper is moved across the surface of the windshield, typically in a back and forth pivotal motion, along the surface of the windshield. In operation, windshield wipers clear precipitation, smudges, stains, and debris from windshields.

A windshield wiper assembly is often comprised of a wiper connected to a wiper arm. The wiper arm is connected to a drive motor and mounted so that it can move with respect to the windshield, typically in a oscillating motion. The wiper arm may include a spring or other resilient element which biases the wiper against the windshield. This allows the wiper to clear the windshield of precipitation and other obstructions, providing a clear view to an operator.

The wiper typically consists of a rubber wiper blade connected to a backing or mounting structure. A variety of different connections may attach the wiper to the wiper arm. For example, the backing of the wiper may be slidably engaged by clamping means at various locations. The clamping means in turn connects to the wiper arm. Other types of quick connector type structures have been developed for wipers and are well known in the art.

Because a clear view is necessary for safe operation of a vehicle, wiper performance is extremely important. Poor wiper performance results in wiper chatter and precipitation streaks. If not designed properly, wipers may also undergo excessive wear requiring frequent replacement. The problem with traditional wiper blades is that they are given a standard radius of curvature while actual windshields vary extensively in their amount of curvature. This results in less than optimal performance of the wiper blade leading to streaking where the radius of curvature of the blade is not enough or to excessive wear when the radius of curvature is too much.

Another problem with traditional wipers is chatter. Chatter is a vibration of the wiper along the windshield. Wiper chattering is undesirable because it leaves streaks on the windshield, results in excess wear on the wiper blade, and creates a sound unpleasant to the operator. Chatter may occur when the friction between the wiper blade and the windshield becomes so great that the wiper blade sticks to the windshield. When this happens, the blade begins to stretch. When the force exerted on the blade by the wiper arm overcomes the friction force between the blade and the windshield, the wiper will be suddenly released, causing it to hop or bounce across the surface of the windshield. Chatter may also result from the wiper sweeping the windshield at an improper angle. The tip of the wiper blade is often connected to the wiper in a manner which allows it to pivot during operating. As the wiper oscillates, the blade will pivot from one direction to the other in accordance with the wiper. In certain circumstances the wiper may fail to pivot properly when the wiper changes directions. When the wiper is swept across the windshield at this improper angle, it will vibrate and cause chatter until the wiper rights itself. Additionally, a high rate of air flowing over the windshield wiper can produce lift, causing the wiper to vibrate and possibly lift from the windshield, resulting in chatter.

SUMMARY

The present invention is, in part, designed to overcome the drawbacks and disadvantages of prior windshield wipers.

A windshield wiper comprises a wiper blade including a squeegee portion for contacting a surface and a body supporting said squeegee portion; a primary spline engaged with said body, said primary spline having first and second ends; a support structure capable of attaching to a wiper arm; and a secondary spline slidingly disposed between said body and said support structure, wherein said secondary spline is retained in place by caps disposed at said first and second ends of said primary spline.

The secondary spline is slidingly and removably disposed between said wiper blade and said support structure, and the secondary spline is retained in place by closure caps fixed onto each end of the primary spline. The secondary spline is an elongated strip of material that minimizes and possibly eliminates any dynamic rollover motion of the wiper blade assembly, particularly in longer wiper blades.

The windshield wiper further comprises a pair of spoilers slidingly disposed on said primary spline and above the secondary spline.

The primary spline comprises a pair of spring bars connected at a first end and open at a second end to facilitate ease of assembly of said wiper blade into said primary spline, whereby a clip is used to close the second open end.

BRIEF DESCRIPTION OF THE DRAWINGS

FIG. 3 is a cross sectional view of the wiper blade of FIG. 2 taken along section line III-III and showing the internal components of the windshield wiper at an end cap.

FIG. 3A is a cross section of the wiper blade taken along line IIIA-IIIA in FIG. 2 showing the internal components that define the wiper assembly between the end cap and the support structure.

FIG. 9 is a partial perspective view of an end portion of the wiper assembly.

FIG. 10 is a partial exploded perspective view of an end portion of the wiper assembly.

DETAILED DESCRIPTION OF EXEMPLARY EMBODIMENT(S)

Figure 1:
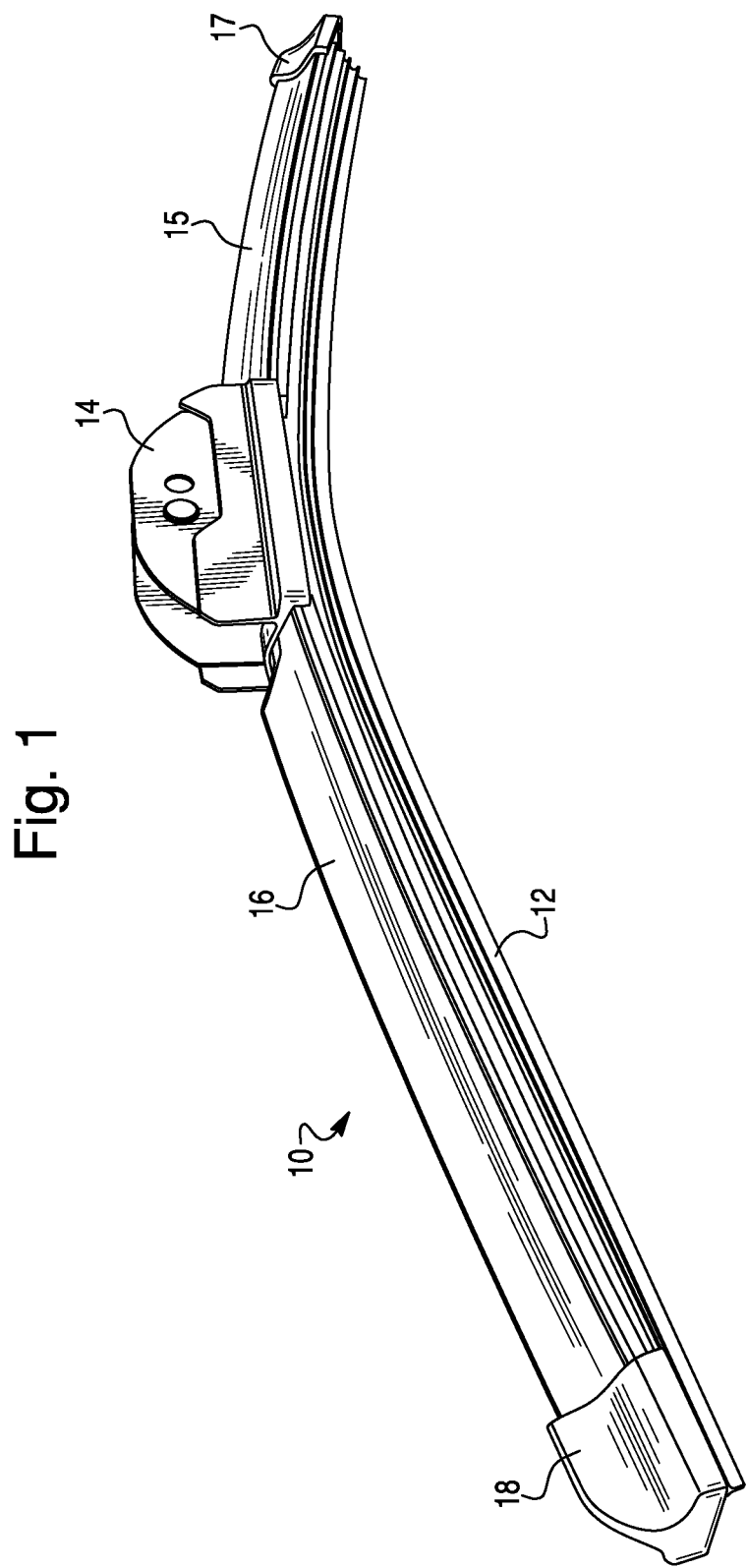
FIG. 1 illustrates a front elevational perspective view of the windshield wiper according to the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

In an exemplary embodiment, the windshield wiper of the present invention overcomes the deficiency of traditional wipers by introducing a secondary spline. This secondary spline increases lateral and radial stiffness in the wiper assembly, preventing chattering. The stiffness of the secondary spline may be changed depending on a combination of variables such as the type of vehicle, the type of windshield, typical speed of the vehicle, average temperature, and the amount and type of precipitation or debris. Inserting the secondary spline into the windshield wiper will impart the characteristics of the spline to the wiper, allowing a single wiper assembly to be optimized for a wide variety of characteristics. In addition to stiffness, the secondary spline may also impart a radius of curvature to the windshield wiper.

Different vehicles will have different sized and shaped windshields. One aspect of the windshields which may vary is their radius of curvature. Therefore, a windshield wiper designed for one vehicle or type of windshield may not be ideally suited for others. This problem is most pronounced in after market or replacement windshield wipers where one type or model of wiper is being marketed to a mass audience. It would be cost prohibitive to design and produce a windshield wiper for every variation of windshield on the market. This problem, however, may be overcome by easily changing the characteristics of the wiper assembly through the replacement of the secondary spline. In certain embodiments, the secondary spline has a radius of curvature which is optimized for a certain vehicle or windshield type. The secondary spline may be removed from the wiper assembly and replaced with a spline having a different degree of stiffness or a different curvature. This allows a single assembly to be mass produced along with a number of interchangeable secondary splines designed to interact with specific types of windshields.

As best shown in FIG. 1, the windshield wiper 10 comprises a wiper blade 12; a support structure 14 for connecting the wiper 10 to a wiper arm (not shown) on a vehicle; first and second spoiler members 15, 16; and end caps 17, 18 for closing the ends of the wiper at ends of a primary spline as will be described in greater detail below.

Figure 2:
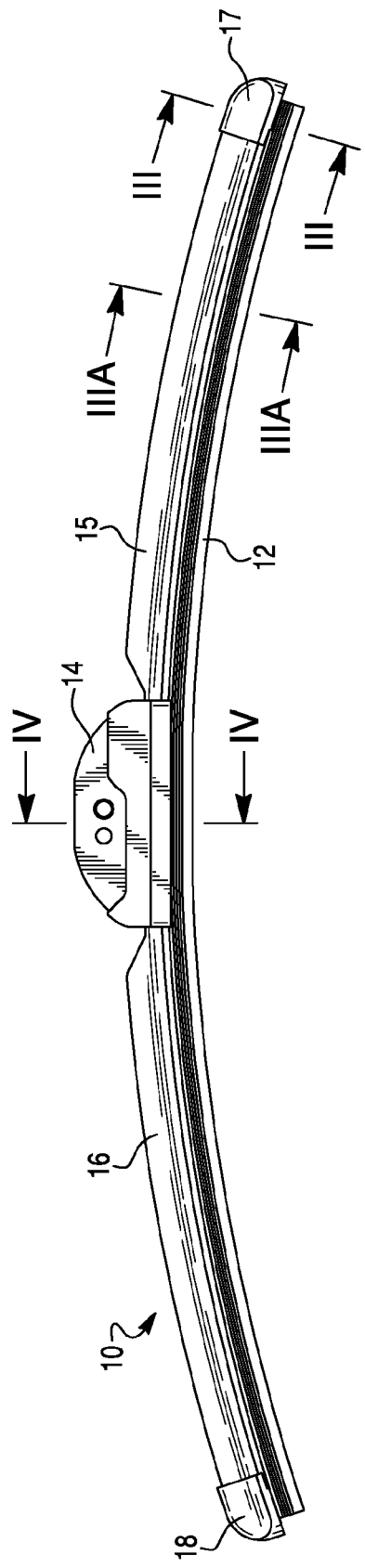
FIG. 2 illustrates a front view of the windshield wiper shown in FIG. 1.
Figure 4:
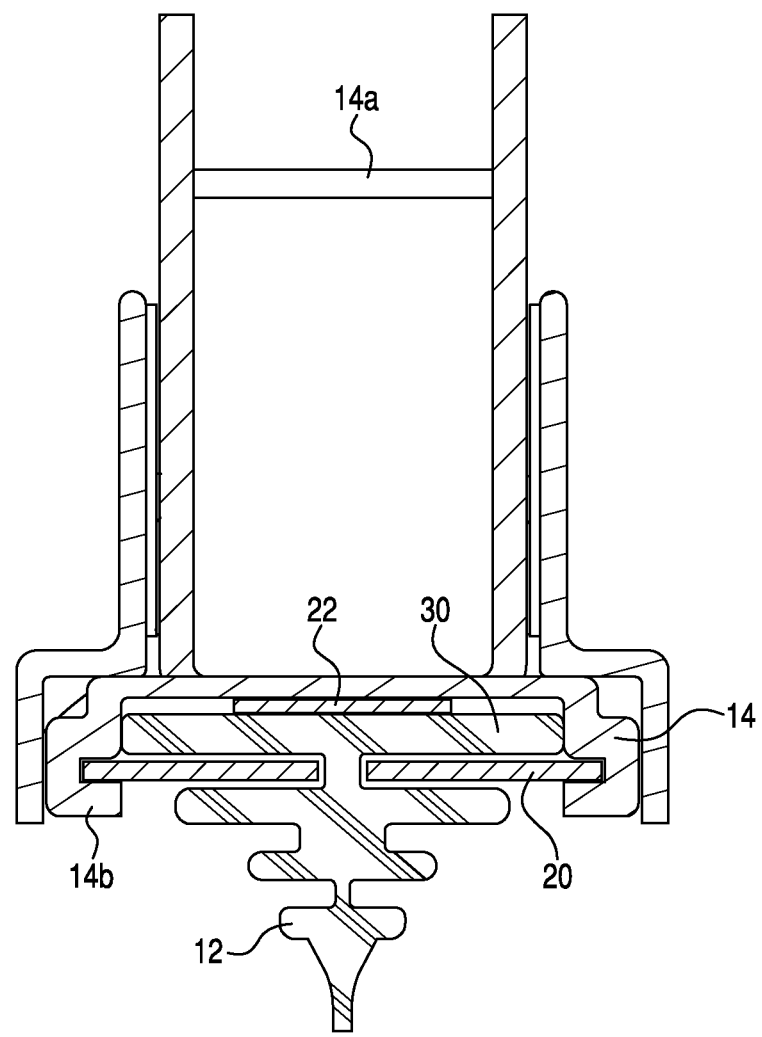
FIG. 4 is a cross section of the wiper blade taken along line IV-IV in FIG. 2 showing the internal components that define the wiper assembly at the support structure.

As shown in FIG. 2, the wiper 10 has a predefined radius of curvature formed during the manufacturing process. FIG. 3 is a cross section of the wiper blade taken along line III-III in FIG. 2 showing the internal components that define the wiper assembly at the end cap 17. FIG. 3A is a cross section of the wiper blade taken along line IIIA-IIIA in FIG. 2 showing the internal components that define the wiper assembly between the support structure 15 and the end cap 17. FIG. 4 is a cross section of the wiper blade taken along line IV-IV in FIG. 2 showing the internal components that define the wiper assembly at the support structure 14. As shown in FIGS. 3 and 4, the wiper 10 includes a primary spline 20 fixed to the support structure 14, and a secondary spline 22 disposed between the wiper blade 12 and the spoiler members 15, 16. The connection between the primary spline 20 and the support structure 14 may be a permanent connection such as via a weld, mechanical crimping or adhesive, or it may be a non-permanent releasable connection which allows the two parts to separate. The support structure 14 is designed to connect to a wiper arm (not shown) in conventional ways known to those of skill in the art. As will be described in further detail below, the wiper blade 12 is connected to the primary spline 20 and the secondary spline 22 is capable of sliding between the support structure 14 and the wiper blade 12 along the longitudinal direction or length of the wiper 10. See arrow 'A' in FIG. 9.

Figure 5:
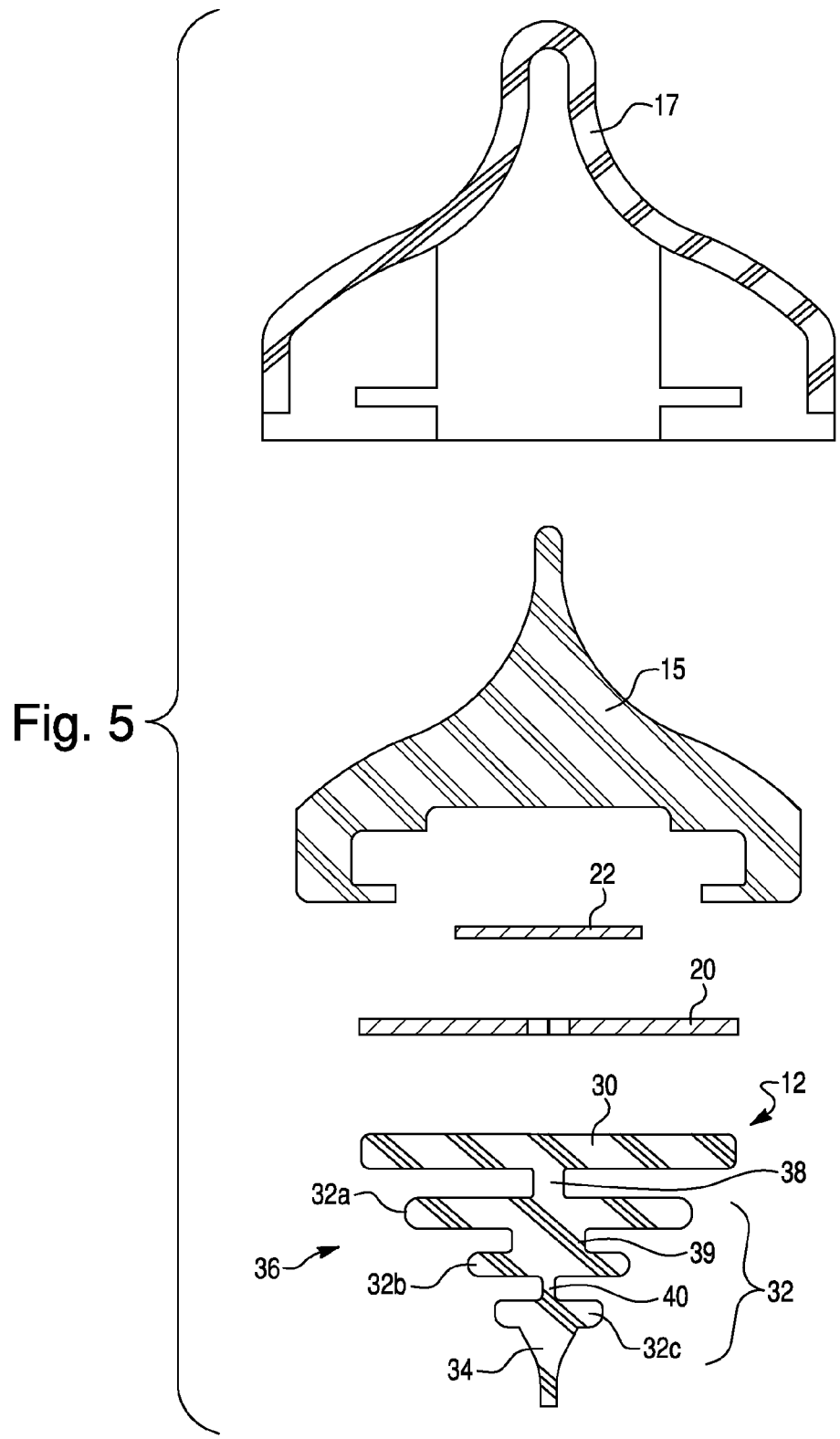
FIG. 5 is an exploded view of the cross-sectional view of FIG. 3.

As best shown in FIG. 5, an exemplary embodiment of a wiper blade 12 has two main portions, an elongated body 30 and a squeegee 32. The squeegee portion is supported by the body which connects the wiper blade to the rest of the windshield wiper. FIG. 5 shows the wiper assembly in an exploded view.

The squeegee 32 comprises a tip 34 and a base 36. The squeegee 32 may be connected to the wiper body 30 via a web 38. This web 38 is a thin section of material which allows the squeegee 32 to pivot with respect to the wiper body 30. In an exemplary embodiment, the squeegee 32 tapers or arcs from the base 36 to the tip 34, creating a pair of surfaces for contacting the windshield of a vehicle. As the wiper blade is moved in a first direction, the squeegee will pivot about the web and lay over to one side, so that the tip, base, and one of the surfaces contacts the windshield. As the wiper blade is oscillated back in the other direction, the squeegee will pivot and lay over to the other side so that the opposite surface is in contact with the windshield. The surfaces may be comprised of various angles and curves depending on the application of the windshield wiper. Additionally, the base need not completely taper to the tip, therefore leaving a planar surface.

The wiper 12 may include a first flange 32a, a second flange 32b, and a tip portion 32c. The first flange 32a connects to the web portion 38 holding the squeegee. The first flange 32a also connects to the second flange 32b via a secondary web portion 39. This secondary web 39 may be of a variety of thicknesses, though it will typically have a thickness greater than the web 38 connecting the squeegee 32 to the body 30. The flanges allow less material to be used and increase the flexibility of the wiper blade.

Figure 6:
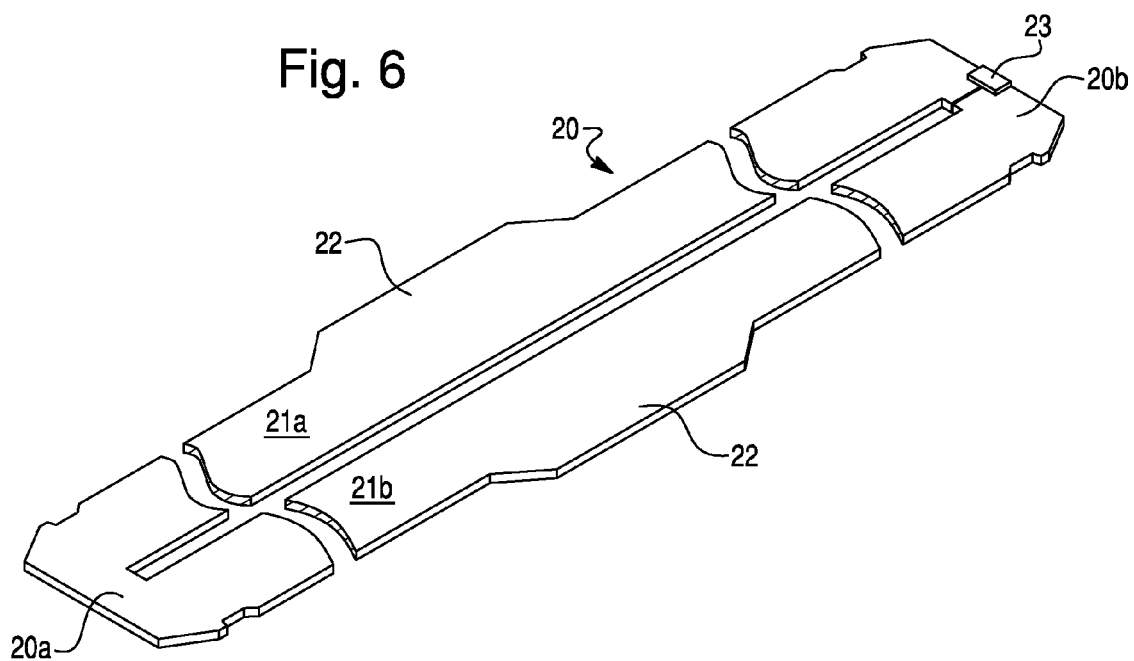
FIG. 6 is a perspective view of the primary spline.
Figure 7:
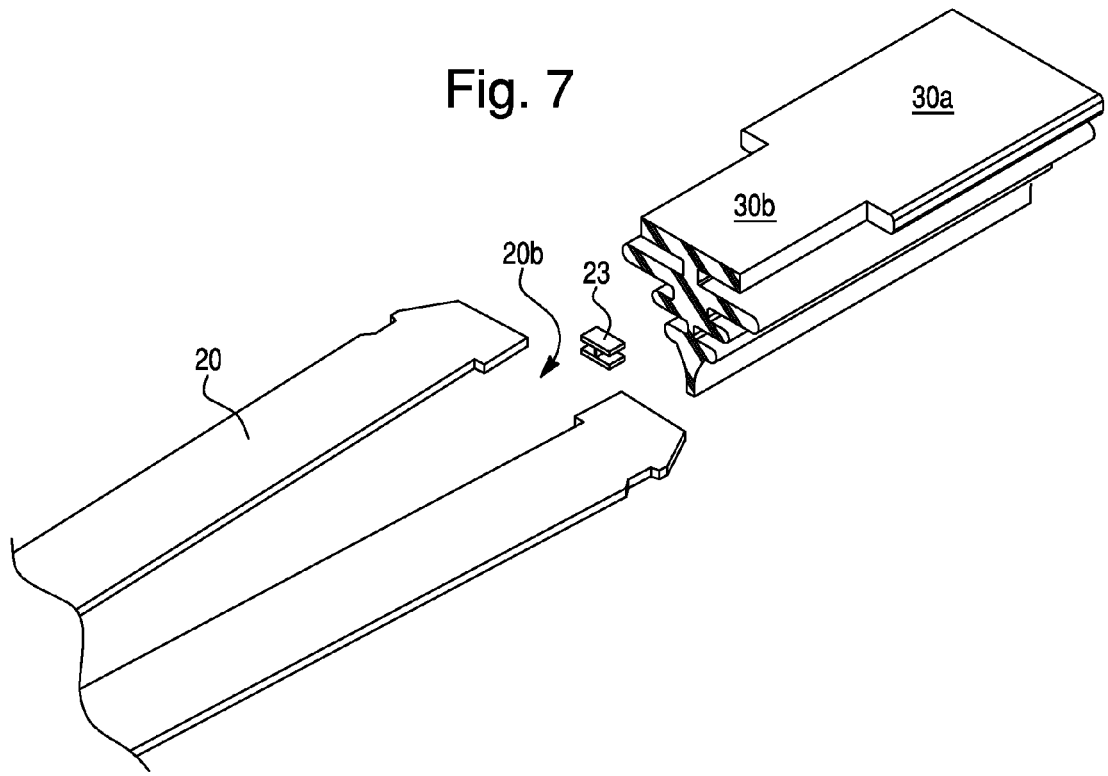
FIG. 7 is a partial perspective view of the open end of the primary spline as the wiper blade in being inserted therein.

The tip portion 32c is connected to the second flange 32b via another web portion 40. As with the other webs, the thickness may vary. The space between the wiper body 30 and the first flange 32a creates a pair of grooves. The wiper blade 12 is slid into the primary spline 20 along these grooves which are designed to interact with the primary spline 20 because the primary spline 20 is formed with a close end 20a and an open end 20b as shown in FIGS. 6 and 7. The wiper blade 12 is inserted at the open end 20b and then be slid along the primary spline 14 until the entire wiper blade 12 is secured. The open end 20b is then closed by a clip 23 as shown in FIGS. 6 and 7. The characteristics of the grooves, though they may vary, ideally should allow the wiper blade to be easily slid into the primary spline while permitting a secure connection that allows the wiper to be retained during normal operation.

Figure 8:
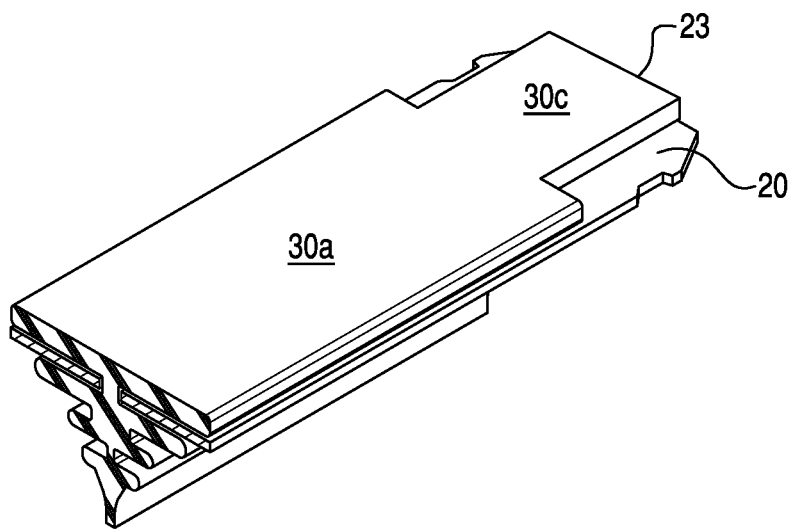
FIG. 8 is a partial perspective view of the open end of the primary spline and a partial view of the wiper blade as assembled.

The wiper body 30 defines a substantially planar portion connected to the first flange 32a by a web 38. In an exemplary embodiment, the wiper body 30 may be broken down into three sections: a central section 30a running along a substantial portion of the wiper blade 12, a first end section 30b (FIG. 7), and a second end section 30c (FIG. 8). The central section 30a may be wider than the end sections 30, 30c and central section 30a is at least as wide as the width of the primary spline 20. The narrower end sections at the end caps 17, 18 may have a width equal to the first flange 32a. This design makes assembly of the wiper blade and the primary spline easier. The narrower end section will easily slide into the primary spline, allowing the wider central section to be drawn along after it. The wider central section 30a also increases stability of the wiper blade by providing greater surface contact between the primary spline 20 and the wiper blade 12.

In an exemplary embodiment, the wiper blade 12 is made from an elastomeric material such as ozone resistant natural rubber, however a polymer or any material suitable for removing precipitation and debris from a windshield without scratching or otherwise causing damage may be used. The wiper may be made from any known process including extruding or molding. A wide variety of designs and types of wiper blades are known in the art. Though a particular design of wiper blade has been described, the aspects of the invention are capable for use with any type of wiper blade.

As best shown in FIGS. 6-8, the primary spline 20 comprises a first spring bar 21a and a second spring bar 21b. The spring bars 21a, 21b may be flat, thin strips of material. In an exemplary embodiment, the spring bars are connected at a first or closed end 20a, while they are separated at a second or open end 20b. This structure allows the spring bars to retain stability while making the insertion of the wiper blade 12 easier. Each of the spring bars may be wider at a certain point along their length to facilitate connection with the support structure. FIG. 6 illustrates a wider or flared portion 22 at the center of the primary spline 20 to facilitate connection to the support structure 14. Depending on the application and the materials used, this connection of the support structure 14 to the primary spline 20 may be permanent such as welding, crimping, press fitting, or adhesion. The connection may also be a releasable connection such as a sliding connection, or a series of notches and tabs. A locking tab or clip 23 may be provided for the open or unconnected end 20b of the primary spline 20. See FIGS. 6 and 7. This tab 23 may have a top section and a bottom section connected by a central post. The top section and bottom section are wider than the central post so that a pair of notches are formed. The notches will fit over the end of the spring bars. When the locking tab is used, a step may be formed in the end of each spring bar. When they are placed together, the steps of the respective spring bars form a channel which receives the central post of the locking tab 23. The locking tab 23 acts to hold the spring bars together, providing greater stability to the primary spline and its connection to the wiper blade. When needed, the locking tab 23 may be easily removed, allowing the spring bars to be separated and the removal of the wiper blade 12. The ends of the spring bars 21a, 21b may also have notches to facilitate a connection with elements of the support structure as further described below.

The primary spline 20 may formed so that it is has a radius of curvature as shown in FIG. 2. When assembling the windshield wiper, the wiper blade is inserted into the primary spline as discussed above. The wiper blade is typically slid into the primary spline by applying a force to one part or section of the blade. The further the wiper blade is inserted, the more the primary spline is brought into contact with the grooves, in turn increasing the friction between the two. When a certain amount of the wiper blade is inserted into the primary spline 20, the amount of friction may become so great as to overcome the applied force, causing the wiper blade to bind. The blade must then be adjusted and slowly slid into the primary spline 20. This increases the amount of time it takes to assemble each wiper. By leaving one end of the primary spline open, the amount of friction between the primary spline and the wiper blade is reduced. This prevents the wiper blade from binding, allowing it to be inserted into the primary spline faster and with less force. When a large number of windshield wipers are being assembled, this reduction in time and effort can translate into a large reduction of manufacturing costs.

As best shown in FIGS. 1 and 4, the support structure comprises a support housing 14 and a connector (not shown). The connector is attached to the housing 14 at the transverse post 14a and is designed to attach to a wiper arm in a manner that is known in the art. Various types of connectors are well known in the art, and would be suitable for use with the present invention. Windshield wiper connectors may be hook type, pin type, reverse hook type, bayonet time, depending on the wiper arm. An example of a pin type connector generally comprises a pair of apertured ears pivotally connected to a pin. A hook type connector generally comprises a connector body pivotally attached to a frame via a pin. The connector body may have an L-shaped recess portion for attaching to the hook of a wiper arm.

In an exemplary embodiment, the housing 14 is attached to the primary spline 20. As discussed above, the housing 14 may be attached to the primary 20 spline in a number of ways. As illustrated in FIG. 4, the housing 14 is connected to the primary spline 20 by a set of tines 14b crimped around the primary spline 20. The connector body is pivotally attached to the housing 14 through a pin or post 14a. The connector body may have a variety of designs. Ideally, the connector is able to accept attachment from all types of wiper arms. More detailed explanations of the types and operation of such connectors may be found, for example, in U.S. Pat. No. 5,606,765 and U.S. Pat. No. 7,584,520, both of which are incorporated herein by reference.

As best shown in FIG. 9, the secondary spline 22 comprises an elongated strip of material that minimizes and possibly eliminates any dynamic rollover motion of the wiper blade assembly, particularly in longer wiper blades. The material of the secondary spline 22 may be metal, a polymer, or any other material that is suitable for imparting stiffness to the windshield wiper. The exact material, thickness, width, length, and stiffness of the secondary spline will vary for each application. The secondary spline 22 may have a notch in its central portion. This notch may engage a projection on the support structure, impeding movement of the secondary spline during normal operation of the wiper. The secondary spline 22 may also be given a longitudinal radius of curvature. The radius of curvature may vary in accordance with the design of a particular windshield.

In an exemplary embodiment, the secondary spline 22 is slidingly disposed into the windshield wiper between the wiper blade 12 and the support structure 14 (see FIG. 4). This sliding feature will allow the secondary spline 22 to be removed and replaced in order to change the characteristics of the windshield wiper. As discussed above, different windshields have different characteristics. Most notable, the longitudinal radius of curvature for windshields will vary depending on the size and type of the vehicle. In order to optimize the performance of the wiper, the secondary spline 22 may be given a stiffness and radius of curvature corresponding to a specific windshield. This is particularly useful in the sale of aftermarket or replacement wipers. Instead of having to design, assemble, package, and sell a windshield wiper for a variety of windshields, a separate secondary spline may be sold which can easily be inserted into a standard wiper assembly. Traditional windshield wipers, in contrast, are sold having a single design with a variety of lengths. The replaceable secondary spline 22 provides a cheap and efficient way of modifying the characteristics of a windshield wiper so that it may be optimized for a wide range of windshields.

As best shown in FIGS. 1 and 9, the windshield wiper may also be provided with a pair of spoilers 15, 16. Each spoiler 15, 16 has a pair of side walls, a top portion which may taper or arc into a tip, and a channel. The channel allows the spoilers to slide over the primary spline 20, the secondary spline 22, and the wiper blade 14. A pair of flanges extending from the bottom walls of the spoiler, engage the bottom of the primary spline, holding the spoiler in place. The tip acts to increase the aerodynamics of the windshield wiper, preventing drag and minimizing the amount of lift on the wiper which can also lead to chattering. The spoilers are typically made from an elastomeric or polymeric material.

The windshield wiper may also be fitted with a pair of end caps 17, 18 which secure the ends of the primary spline 20 and retain the slidable and removable secondary spline 22 in place. The end caps 17, 18 comprise a tip which tapers or arcs into a pair of sidewalls. The end caps will ideally have similar characteristics to the spoilers so that the aerodynamics and appearance of the wiper are improved. A recessed seat provides an open space which partially fits around the spoiler. A slot is also formed into the seat which allows the end cap to be slid onto the primary spline. In various embodiments, the slot will not extend all the way to the front of the end cap. The opening provided between the slot and the front of the end cap is designed to interact with the notches formed in the spring bars 21*a*, 21*b* of the primary spline 20, further securing the end cap 17, 18 in place.

As will be understood from the foregoing description, the secondary spline 22 is secured to the wiper assembly by the end caps 17, 18 because the secondary spline 22 is slidingly disposed between the wiper blade 12 and the housing or support structure 14. It is also noted that the interface of the secondary spline 22 with the central housing 14 provides additional stability because the secondary spline is essentially retained in place at three primary points; the end cap 17, the central housing (support structure) 14 and the end cap 18. This retention feature for the secondary spline is unique to this invention.

In an exemplary embodiment, certain aspects of the present invention may also be used in connection with a wiper blade refill. Wiper blades tend to wear out over time. Wear is often a result of repeated use of the wiper blade as well as the oxidation and degradation of the wiper blade caused by exposure to the environment. Instead of replacing the entire wiper, the wiper blade may be removed and replaced. New wiper blades can be sold separately and easily slid into the existing wiper. The replacement wiper blades may also be packaged with different secondary splines. As discussed above, the properties of the secondary spline, such as the stiffness and radius of curvature, may be optimized for windshields used in different vehicles. Selling the wiper blade and secondary spline separate from the rest of the windshield wiper allows a consumer to purchase the optimal wiper for their particular vehicle.

The foregoing description of the exemplary embodiments of the present invention has been presented for the purpose of illustration. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. Moreover, features or components of one embodiment may be provided in another embodiment. Thus, the present invention is intended to cover all such modification and variations.

What is claimed:

1. A windshield wiper comprising:
   a wiper blade including a squeegee portion for contacting a surface and a body supporting said squeegee portion, said squeegee portion being connected to said body by a web, said body having a body width greater than a web width of said web;
   a primary spline engaged with said body on opposite sides of said web, said primary spline having first and second ends, said primary spline being planar in shape defining outermost free edges lying below an uppermost surface of said body;
   a support structure capable of attaching to a wiper arm, wherein said support structure wraps around and engages said outermost free edges;
   a secondary spline slidingly disposed between said body and said support structure, said secondary spline contacting an uppermost surface of said body and being above said web,
   wherein said secondary spline is retained in place by caps disposed at said first and second ends of said primary spline, and
   wherein said secondary spline is above a center of an entirety of said wiper blade to evenly distribute a pressure of said wiper arm along its length during use.

2. A windshield wiper according to claim 1, wherein said secondary spline is removably disposed between said wiper blade and said support structure.

3. A windshield wiper according to claim 1, further comprising at least one spoiler slidingly disposed on said primary spline and above said secondary spline.

4. A windshield wiper according to claim 1, wherein said primary and secondary splines are formed with a predefined radius of curvature.

5. A windshield wiper according to claim 1, wherein said primary spline comprises a pair of spring bars connected at a first end and open at a second end to facilitate ease of assembly of said wiper blade into said primary spline.

6. A windshield wiper according to claim 5, further comprising a closure clip connected at said second end of said primary spline to close said open end.

7. A windshield wiper according to claim 1, wherein said support structure is connected to said primary spline.

8. A windshield wiper according to claim 1, wherein said squeegee portion further comprises a base and a tip.

9. A windshield wiper comprising:
   an elongated wiper blade having a squeegee portion for contacting a surface and a body portion connected to said squeegee portion via a web, wherein a centerline passes through said squeegee and said web of said elongated wiper blade, said centerline defining a plane that extends a length of said wiper blade;
   a first spline contacting said body portion, said first spline comprising a pair of spring bars disposed on opposite sides of said web with said centerline being disposed between said spring bars, said spring bars being connected at a first end and separated at a second end to facilitate ease of assembly of said first spline and said body portion, said first spline being planar in shape defining outermost free edges lying below an uppermost surface of said body portion;
   a support structure directly connecting said wiper blade to a wiper arm through a pin-type connector passing through an aperture in said support structure, said support structure directly connected to and in contact with said first spline, wherein said support structure wraps around and engages said outermost free edges;

an elongated second spline disposed between and contacting said wiper blade and said support structure, wherein said second spline is a single metallic bar in contact with said support structure and said body portion, wherein said centerline passes through a midsection of said second spline whereby said second spline is above a center of an entirety of said wiper blade to evenly distribute a pressure of said wiper arm along its length during use.

10. The windshield wiper according to claim 9, wherein said second spline is sandwiched between and in contact with said wiper blade and said support structure.

11. The windshield wiper according to claim 10, wherein said second spline is fixed in place relative to said first spline by a pair of caps fixedly disposed at each end of said first spline.

12. A wiper refill, comprising:
an elongated wiper blade having a squeegee for contacting a surface and a body supporting said squeegee via a web, the body having two grooves running along the length thereof, said wiper blade defining a plane extending through a center of said squeegee and said web, said plane extending along a length of said wiper blade; and an elongated first spline having a longitudinal radius of curvature and a stiffness greater than said wiper blade, said elongated first spline being planar in shape defining outermost free edges lying below an uppermost surface of said body;

an elongated second spline slidingly disposed between said body of said wiper blade and a support structure adapted for direct attachment to a wiper arm, wherein said second spline is a single metallic bar in contact with said support structure and said body portion, and wherein said plane passes through a central portion of said second spline, wherein said support structure wraps around and engages said outermost free edges;

wherein said elongated first spline comprises a pair of spring bars connected at a first end and separated at a second end to facilitate ease of assembly of said elongated spline and said body portion.

13. A wiper refill according to claim 12, wherein said body comprises a top portion having a first width along a first end, a second width greater than said first width along a majority of said wiper blade body, and a third width less than said second width along a second end, wherein said second width is at least as wide as said elongated first spline except at the center portion of said first spline.

14. A windshield wiper comprising:
an elongated wiper blade having a squeegee portion for contacting a surface and a body portion connected to said squeegee portion by a web, said squeegee and said web defining a centerline of said wiper blade;

a first spline contacting said body portion, said spline comprising a pair of spring bars extending along longitudinal sides of said web of said wiper blade, said first spline being planar in shape defining outermost free edges lying below an uppermost surface of said body portion;

a support structure capable of connecting wiper blade to a wiper arm, said support structure directly connected to and in contact with said first spline, wherein said support structure wraps around and engages said outermost free edges;

an elongated second spline disposed between said first spline and said support structure, wherein said second spline is a single metallic bar in contact with said support structure and said body portion, said centerline passing through a center of said second spline, wherein said second spline is above a center of an entirety of said wiper blade to evenly distribute a pressure of said wiper arm along its length during use" and wherein said second spline is slidingly disposed with respect to said first spline and said support structure.

* * * * *